(12) United States Patent
Gerald, II et al.

(10) Patent No.: US 8,541,129 B1
(45) Date of Patent: *Sep. 24, 2013

(54) ACTIVE MEMBRANE HAVING UNIFORM PHYSICO-CHEMICALLY FUNCTIONALIZED ION CHANNELS

(75) Inventors: Rex E. Gerald, II, Willow Springs, IL (US); Katarina J. Ruscic, Chicago, IL (US); Devin N. Sears, Spruce Grove (CA); Luis J. Smith, Westborough, MA (US); Robert J. Klingler, Glenview, IL (US); Jerome W. Rathke, Homer Glen, IL (US)

(73) Assignee: U.S. Department of Energy, Washington, DC (US)

( * ) Notice: Subject to any disclaimer, the term of this patent is extended or adjusted under 35 U.S.C. 154(b) by 195 days.

This patent is subject to a terminal disclaimer.

(21) Appl. No.: 12/838,608

(22) Filed: Jul. 19, 2010
(Under 37 CFR 1.47)

Related U.S. Application Data

(63) Continuation-in-part of application No. 11/031,960, filed on Jan. 7, 2005, now abandoned, and a continuation-in-part of application No. 11/939,721, filed on Nov. 14, 2007, which is a continuation-in-part of application No. 11/690,413, filed on Mar. 23, 2007, now Pat. No. 8,119,273.

(60) Provisional application No. 60/535,122, filed on Jan. 7, 2004.

(51) Int. Cl.
*H01M 2/18* (2006.01)
*H01M 2/16* (2006.01)

(52) U.S. Cl.
USPC .................. 429/145; 429/250; 429/251

(58) Field of Classification Search
USPC ............................ 429/145, 251, 247
See application file for complete search history.

(56) References Cited

U.S. PATENT DOCUMENTS

| | | | | |
|---|---|---|---|---|
| 6,447,958 B1* | 9/2002 | Shinohara et al. | ............ | 429/248 |
| 6,586,133 B1* | 7/2003 | Teeters et al. | .................. | 429/152 |
| 8,119,273 B1* | 2/2012 | Gerald et al. | .................. | 429/145 |
| 2002/0031706 A1* | 3/2002 | Dasgupta et al. | ............. | 429/212 |
| 2007/0218371 A1* | 9/2007 | Elliott et al. | .................. | 429/307 |

* cited by examiner

*Primary Examiner* — Patrick Ryan
*Assistant Examiner* — Lucas J O Donnell
(74) *Attorney, Agent, or Firm* — Brian J. Lally; Mark P. Dvorscak; John T. Lucas

(57) ABSTRACT

The present invention relates to a physicochemically-active porous membrane for electrochemical cells that purports dual functions: an electronic insulator (separator) and a unidirectional ion-transporter (electrolyte). The electrochemical cell membrane is activated for the transport of ions by contiguous ion coordination sites on the interior two-dimensional surfaces of the trans-membrane unidirectional pores. One dimension of the pore surface has a macroscopic length (1 nm-1000 μm) and is directed parallel to the direction of an electric field, which is produced between the cathode and the anode electrodes of an electrochemical cell. The membrane material is designed to have physicochemical interaction with ions. Control of the extent of the interactions between the ions and the interior pore walls of the membrane and other materials, chemicals, or structures contained within the pores provides adjustability of the ionic conductivity of the membrane.

19 Claims, 6 Drawing Sheets

ACTIVE MEMBRANE HAVING UNIFORM PHYSICO-CHEMICALLY FUNCTIONALIZED ION CHANNELS

RELATION TO PREVIOUS PATENT APPLICATIONS

The present non-provisional patent application is a continuation in part and claims priority to U.S. application Ser. No. 11/031,960, filed on Jan. 7, 2005, and U.S. application Ser. No. 11/939,721, filed on Nov. 14, 2007, which is a continuation in part of U.S. application Ser. Nos. 11/031,960 and 11/690,413, filed on Mar. 23, 2007, all of which claim priority to U.S. Provisional Patent Application No. 60/535,122, filed on Jan. 7, 2004, by the instant inventors, and all of which are hereby incorporated by reference in their entirety.

U.S. GOVERNMENT RIGHTS

The United States Government has rights in this invention pursuant to Contract No. W-31-109-ENG-38 between the U.S. Department of Energy and the University of Chicago, representing Argonne National Laboratory.

TECHNICAL FIELD

The invention relates to an active, porous membrane and method of making the same. More specifically the invention relates to a porous, metal oxide membrane having uniform, physicochemically functionalized ion channels capable of adjustable ionic interaction.

BACKGROUND

Increased use of consumer electronics such as cellular telephones, laptop computers and other portable devices, and the development of new technologies like electric vehicles (EV) has increased the demand for compact, durable, high capacity batteries. This demand is currently being filled by a variety of battery technologies including traditional lithium ion batteries. However, the metal packaging of traditional batteries makes them heavy, thick, prone to leakage and difficult to manufacture. A new generation of solid-state batteries is emerging that allow the fabrication of consumer batteries in a wide variety of shapes and sizes that are thinner, safer and more environmentally friendly. However, state of the art, solid-state batteries have several shortcomings including relatively low values of ion conductivity.

Lithium polymer electrolytes have received considerable interest for use in solid-state batteries. These electrolyte systems are complex materials composed of amorphous and crystalline phases. It has been known since 1983 that the ion motion in polymer electrolyte occurs predominantly in the amorphous phase. Accordingly, the conventional approach to improving ionic conductivity has been to investigate conditions that either decrease the degree of crystallinity or increase the segmental motion of the polymer matrix. However, despite significant improvement, modern lithium-ion batteries employing polymer electrolytes are limited by lithium ion conductivities of order $10^{-6}$ S cm$^{-1}$ at ambient temperatures. This level of conductivity is not sufficient for many consumer battery applications.

The $10^{-6}$ S cm$^{-1}$ conductivity ceiling was overcome by true solid-state batteries developed by Duracell in the 1970s which used pressed aluminum oxide ($Al_2O_3$) powder and Li salt (LiI) as the electrolyte material. See, U.S. Pat. No. 4,397,924 issued to Rea on Aug. 9, 1983 (Rea '924). The solid alumina electrolyte provided two orders of magnitude greater conductivity than polymer electrolytes due to the hopping mechanism by which lithium ions can travel across the surfaces of alumina particles by hopping from oxide oxygen to oxide oxygen on the amorphous surface. (Kluger K, Lohrengel M, Berichte Der Bunsen-Gesellschaft-Physical Chemistry Chemical Physics, 95 (11): 1458-1461 NOV (1991)). However, this ion conduction only occurs when sufficient contact between the two alumina particles is both created and maintained. The Rea '924 patent overcame the first part of the contact problem by severely compressing the components at compressive strengths in the order of 100,000 psi. The result is a very dense solid-state electrolyte. However, overtime the ionic conductivity of the electrolyte decreases as the contact between particles degrades. This is especially true when the electrolyte is subjected to shock or other trauma. Because Rea relies on physical compression to create contact between alumina particles, very small change in the contact between the alumina particles has a profoundly negative effect on the ion conduction of the material. In fact, this technology was virtually abandoned because of this limitation.

Recently aluminum oxide ($Al_2O_3$) membranes have been considered for use as battery materials by other researchers, however, the mechanism for lithium-ion conductivity of the membrane itself has neither been considered nor explored, nor has the modification and adjustment of the membrane. For example, U.S. Pat. No. 6,586,133 issued to Teeters et al., on Jul. 1, 2003 (Teeters '133) teaches a nano-battery or micro-battery produced by a process comprising: providing a membrane with a plurality of pores having diameters of 1 nm to 10 µm, filing said membrane with an electrolyte; and capping each filled pore with an electrode from about 1 nm to about 10 µm in diameter in communication with said electrolyte to form individual nano-batteries or micro-batteries. While Teeters '133 suggests the use of aluminum oxide membranes, it teaches the membranes solely as a "jacket" for nano or micro cells. The Teeters patent is directed solely to the creation of nano and micro batteries and never teaches or even suggests using the membrane to enhance the ion conductivity of the electrolyte in a synergistic manner. For example, the preferred pore diameter range of Teeters' system is much too large for meaningful ion conductivity enhancement by the metal oxide membrane. Furthermore, Teeters teaches the use of AAO membranes with low pore densities and porosities which are inadequate for producing effective active membranes. Teeters also teaches that the anode and cathode material of the preferred embodiment are contained inside the pore of the AAO membrane. Teeters invention, can be fabricated equally well by employing a variety of materials having pores. The principle of Teeters is the miniaturization of a battery cell using AAO as a nano-container, not as a material for enhancing the performance of the battery itself.

Mozalev, et al. teach a porous alumina membrane as the separator for macrobatteries. See, A. Mozalev, S. Magaino, H. Imai, Electrochimica Acta, 46, 2825 (2001). Their work has suggested that alumina membranes mechanically suppress Li dendrite formation, thereby improving cycling efficiencies. However, they have not suggested or discussed the lithium-coordinating role aluminum oxide membrane walls can play, nor have they taught an optimization of this parameter. The object of the Mozalev invention is to mitigate formation of dendrites by use of a hard material for a battery separator. Any hard material will serve the object of Mozalev's invention.

A major breakthrough in the room-temperature conductivity of lithium polymer electrolytes would significantly impact the rechargeable consumer battery market, as well as the emerging electric vehicle (EV) arena. Despite more than 20 years of active industrial and academic investigation, the current level of conductivity for lithium polymer electrolytes is not sufficient for many battery applications and suggests that a radical new approach based on a better understanding of ion transport is required.

SUMMARY

The present invention relates to a novel membrane system capable of adjustable ion conductivity. The novel characteristics of the invented membrane stem from a better understanding of the ion-conductivity of certain membranes like anodized aluminum oxide (AAO) that have well-defined channels structures, and the membrane's synergistic relationship with various ion-coordinating substances. While prior art references teach the use of certain specialized materials like AAO as part of an electrolyte (Rea '924) and as a nano or micro-container for the creation of nano and macro batteries (Teeters '133), the prior art fails to teach or even suggest the use of a well-defined, physically and chemically active AAO porous membrane (wherein the pores are coated with at least one ionic species) capable of ion-coordination and ion conduction which acts as both a separator and an electrolyte. Unlike the innocuous membrane disclosed in Teeters '133, the present membrane is designed to transport ions without the addition of an electrolyte to the pore. Thus, a key component in Teeter's invention, the electrolyte, is replaced by an activated channel in the present invention. In other words, a unidirectional solid-state ion-hopping mechanism in one or more embodiments of the present invention replaces diffusive ion transport in liquid electrolytes and the segmental motion mediated ion transport in polymer electrolytes.

The present invented membrane is both a separator and electrolyte within the same monolithic structure. The chemical composition, physical arrangement of atoms, and physical geometry of the pores play a direct role in the sequestration and conduction of ions. In one preferred embodiment of the presented membrane, the ions are transported via the ion-hopping mechanism where the oxygens of the $Al_2O_3$ wall are available for positive ion coordination (i.e. $Li^+$). The membrane can be adjusted to a desired level of ion conductivity by manipulating the chemical composition and structure of the pore wall to either speed up or slow down ion conduction. Physical aspects of the membrane (i.e. pore size, porosity and tortuosity) can also be varied to control conductivity. This adjustability allows one to create customized membranes and batteries specifically tailored for a particular application.

One general object of the present invention is a monolithic porous, ion-conductive membrane which can act as a separator-electrolyte.

One embodiment of the invention generally comprises: an active, porous, ion-conducting membrane, wherein the pores of the membrane are coated with ionic species, and wherein the membrane acts as both a separator and electrolyte.

Another embodiment of the invention relates to a membrane in which the faces of the membrane are coated with an ion-conducting polymer creating a laminate-membrane that obviates problems associated with ion transport at the interface and polarization.

One or more embodiments of the invention relate to a membrane having the surface of its pore walls coated, wherein the thickness of the pore coating is preferably less than about one half the pore diameter, and more preferably less than about one quarter the pore diameter.

Yet another embodiment of the invention relates to a membrane which can act as both a separator-electrolyte and an electrode, one side of the AAO membrane being composed of Al metal which acts as an electrode. A salient aspect of the present invention is changing the physical characteristics of the membrane and its pores (i.e. pore diameter, porosity, tortuosity etc.) in order to tailor the membrane for specific applications.

Still another aspect of the present invention is manipulation of the chemical matrix of the pores to tailor the membrane for specific applications.

In one embodiment a salient aspect of the invention relates to the pore density that produces a porosity ranging from 5-65%. Larger porosities generally relate to greater rates of conductivity and thus porosity can be used to tailor the membrane for specific uses.

In one embodiment the tortuosity of the membrane is unity. A tortuosity of unity is generally considered the ideal value for fast rates of conductivity. However, membranes having tortuosity values greater than unity may be used.

Another salient aspect of the invention relates to safety features of the membrane which shut down the battery when critical temperatures are reached.

One embodiment of the invention relates to a synergistic membrane in which the walls of the membrane pores are coated with ion and a polymer material like polyethylene oxide and wherein the nanochannels of the AAO membrane are preferably oriented normal to the electrodes, so to provide the shortest path between them. Thus the pore walls of this synergistic membrane can act as a superhighway for maximizing ion conduction allowing ions to travel via the hopping mechanism of the AAO membrane, via segmental motion via the polymer, via both mechanisms, or by a superposition mechanism.

One of the keys to this synergism in the surface area to volume ratio (SA:V) of the membrane pores. Thus, a salient aspect of the invention is a manipulation of the pore size present in the AAO membrane.

One preferred embodiment of the invention generally comprises: a metal oxide material having a plurality of pores running the width of the material, the pores having a defined diameter ranging from about 2 nm-150 nm, wherein the pores are modified to impart atomic coordination sites for positive ions and an interactive force field that projects from the pore walls outward into the center of the pore. The metal oxide is preferably AAO.

Another preferred embodiment of the invention generally comprises: a metal oxide material having a plurality of pores running the width of the material, the pores having a defined diameter ranging from about 2-50 nm.

One general aspect of the present invention relates to an active membrane having physicochemically functionalized ion channels capable of adjustable ionic interaction.

Another general aspect of the present invention relates to a porous membrane for electrochemical cells, the membrane having, physicochemically functionalized ion channels capable of adjustable ionic interaction. An advantage of the membrane is the ability to tailor the ion-conductivity of the membrane for specific uses. For example, ion-conductivity could be maximized for applications requiring fast responses and/or large amount of energy (i.e. EV acceleration) while ion conductivity could be lowered for less strenuous applications where high ion conductivity is not needed and/or if available would pose a safety hazard.

A general object of the present invention is formation of a novel electrolyte system that overcomes problems associated with prior art electrolytes.

While prior attempts teach the use of certain specialized materials like metal oxides as part of an electrolyte (Rea '924)

and as a nano or micro-container for the creation of nano and macro batteries (Teeters '133), the prior art fails to teach or even suggest the use of a well-defined, physically and chemically active monolithic membrane separator/electrolyte capable of ion coordination and ion conduction of large quantities of charge, which acts as both a separator and electrolyte. Unlike the innocuous membrane disclosed in Teeters '133, the separator/electrolyte membrane of the one or more embodiments of the present invention is designed to transport large quantities of ions without the addition of an electrolyte to the pore volume.

BRIEF DESCRIPTION OF THE DRAWINGS

These and other features, aspects, and advantages of the multiple embodiments of the present invention will become better understood with reference to the following description, appended claims, and accompanied drawings where:

DETAILED DESCRIPTION

Figure 1:
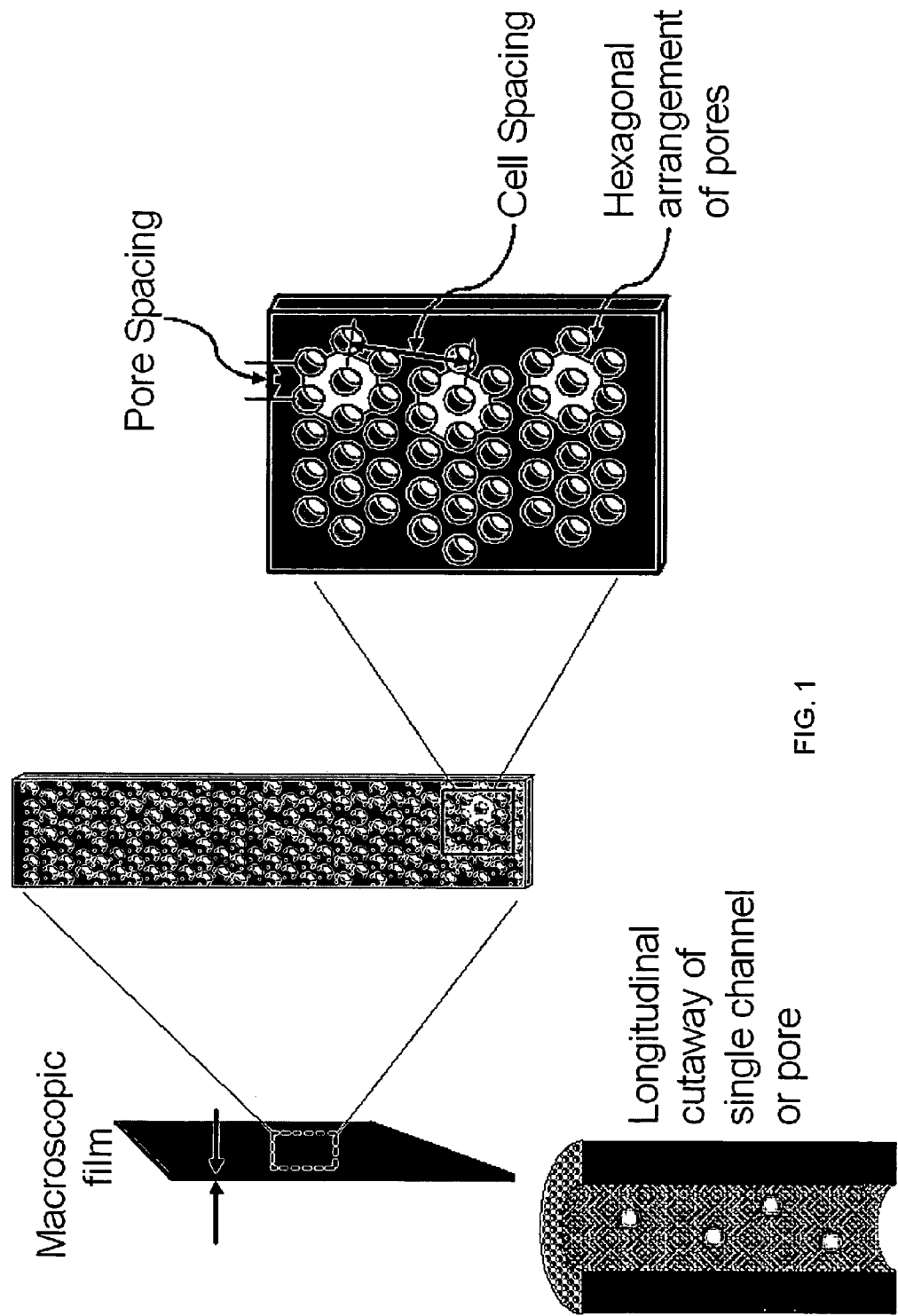
FIG. 1 is a schematic of the invented monolith membrane comprising a flat thin film, a high density of ordered and cylindrical channels directed from a top to a bottom surface, and interior channel walls chemically activated for interaction with ions.
Figure 2:
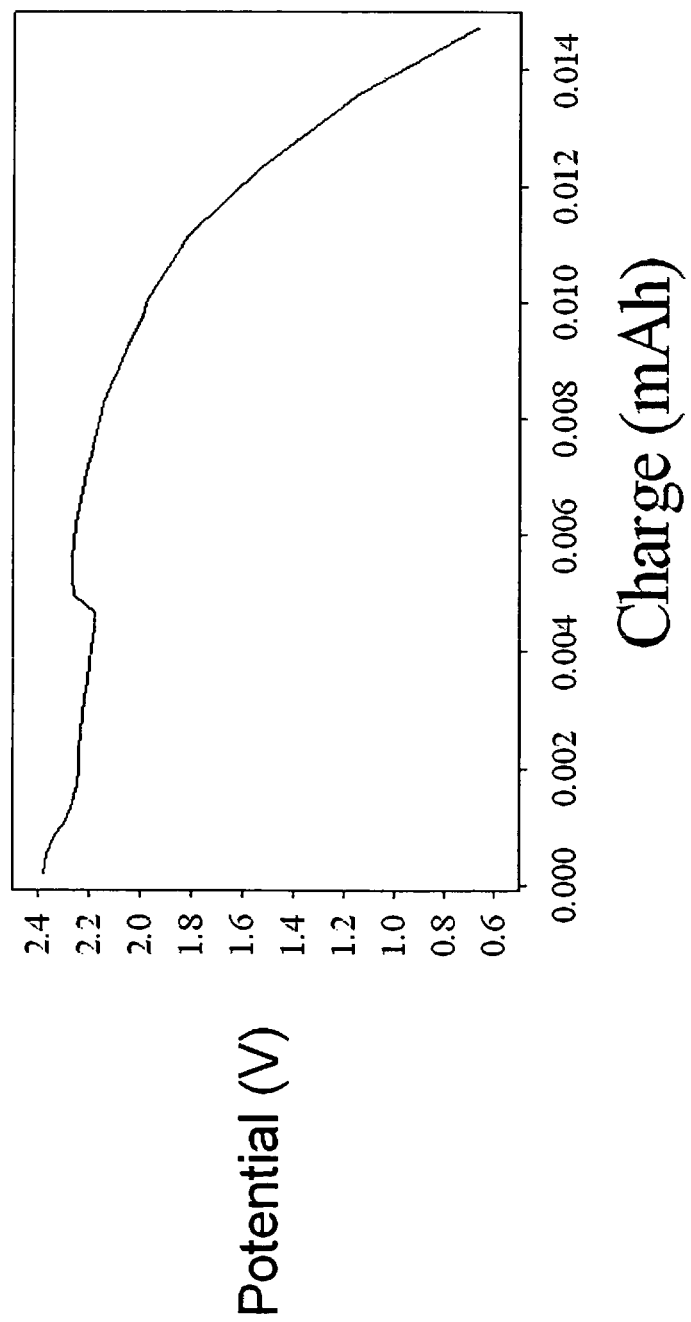
FIG. 2 is a graph of voltage plotted on the ordinate and time plotted on the abscissa representing the discharge curve of a cell comprised of an aluminum disk cathode, a porous monolith membrane of anodized aluminum oxide having the interior surfaces of the pores coated with a polymer electrolyte as a separator/electrolyte, and a lithium metal film anode.
Figure 3:
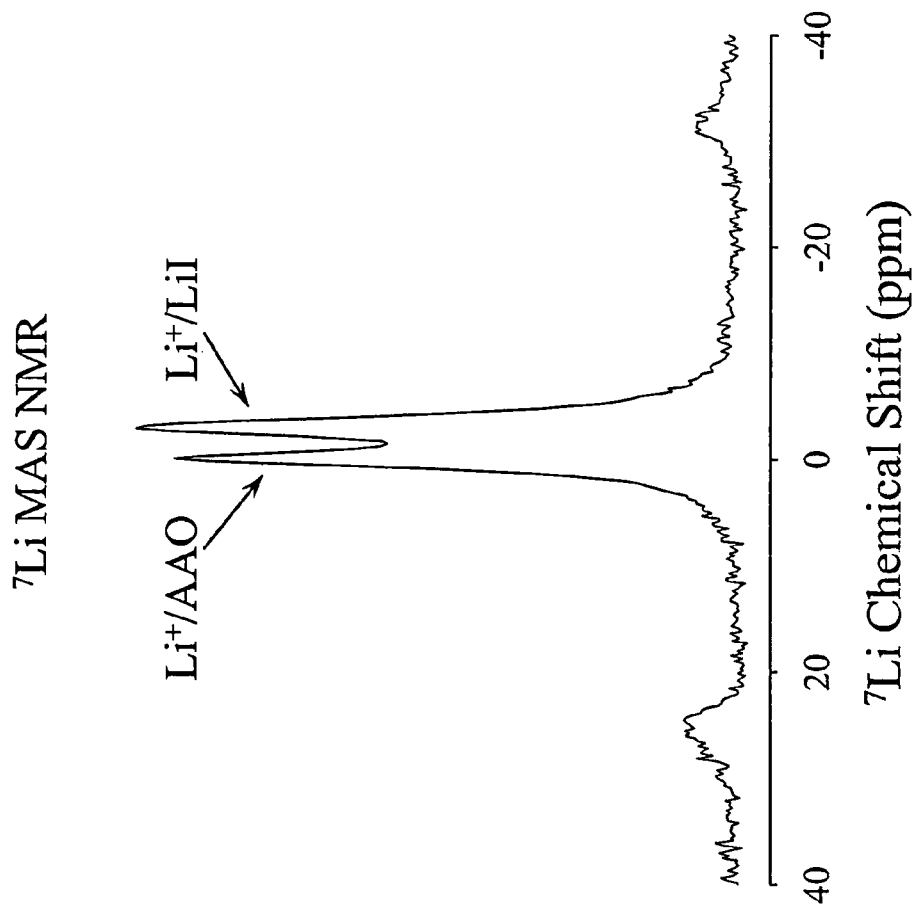
FIG. 3 relates to ionic lithium in a $LiI/Al_2O_3$ solid state electrolyte system and depicts $^7Li$ MAS NMR spectra of LiI-coated AAO membrane. The pore walls of the AAO membrane interact with LiI to produce highly mobile $Li^+$ ions. The LiI/AAO system shows that approximately 50% of lithium is ionic and highly mobile; the remainder of lithium is immobilized in LiI crystals. This spectra shows that the walls have been coated with LiI and the walls have activated the lithium ions for conduction.
Figure 4:
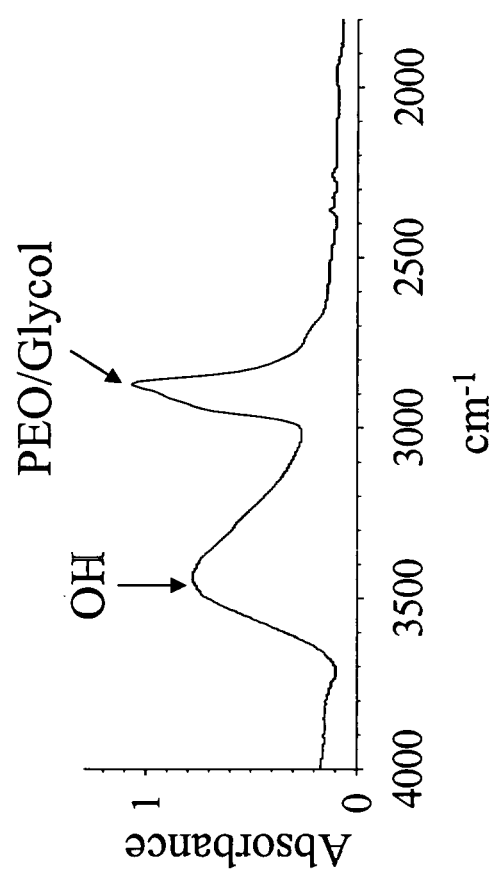
FIG. 4 is a FTIR spectrum of poly(ethylene glycol)-coated membrane. The absorbance peak in the region 2800-2900 $cm^{-1}$ confirms a coating of poly(ethylene glycol) or other polyethers on the pore walls of the AAO membrane. The broad absorbance peak centered between 3400 and 3500 $cm^{-1}$ indicates that surface hydroxides and water molecules are also on the pore walls.

The instant invention relates to a physicochemically active, ion conducting membrane generally comprising: a specialized material (i.e. AAO) having a plurality of pores running the thickness of the material, the pores having diameters ranging from 2 nm to 150 nm, the pores being modified with an ion-conducting species or compound.

A salient feature of the invented membrane is the interaction of the membrane channel walls with ions and compounds that have varying degrees of activity with ions. The membrane can be made of a variety of specialized materials having ion coordinating capability including but not limited to: metal oxides, plastics like SSZ-24 and ALPO-11, and various silicate glasses.

Suitable metal oxides include but are not limited to amorphous titanium oxide, titanium dioxide, di-titanium trioxide, AAO, amorphous aluminum oxide, di-aluminum trioxide, alumina, crystalline alpha aluminum oxide, crystalline beta aluminum oxide, crystalline gamma aluminum oxide, magnesium oxide, silicone oxide, vanadium oxide, zirconium oxide, germanium oxide, tin oxide, gallium oxide, indium oxide, iron oxide, chromium oxide, molybdenum oxide, nickel oxide, copper oxide, zinc oxide and combination thereof. Various metal alloy-oxides could also be used. AAO is a preferred metal oxide because of its adjustable physical pore structure and ion conducting ability.

The thickness of the membrane is a salient aspect of the invention and can be varied according to desired results. Thicker membranes (30-50 microns) have higher levels of resistance and are preferable when a robust membrane (and battery) is desired. Thinner membranes (10 nm-1000 nm) are better suited for applications that require low resistance. Membranes of medium thickness (1 micron-30 microns) can be used for applications in between.

Thin membranes are also useful in situations where the membrane is combined with a polymer, laminate or other substance that helps support the membrane (see, AAO-polymer hybrid and AAO-laminate discussed below).

The ability to control the dimensions of the pores in AAO makes it an ideal active membrane material. Controlling the physical and chemical properties of the membrane's pore walls allow the creation of customized membranes tailored for specific uses. When anodized under specific conditions, the AAO pores form a highly-ordered hexagonal arrangement of nano-channels perpendicular to the anode surface and the pore diameter, pore length, pore spacing and pore-ordering are all adjustable by varying the current, temperature, time, and choice of acidic electrolyte in which the membrane is grown (H. Masuda, M. Satoh, Jpn. J. Appl. Phys 35, 126 (1996)). The physical and chemical characteristics of the pore walls are important variables in controlling ion-conduction.

Physical Modifications

A critical aspect of the invented membrane is the surface area to volume (SA:V) of the membrane pores. The pores of one preferred embodiment of the invented membrane have a surface area to volume ratio in the range $2 \times 10^7 - 2 \times 10^9$ $m^{-1}$. A high SA:V ratio corresponds to high levels of ion coordination occurring by the fast ion-hopping mechanism of the membrane's walls. One achieves a high SA:V ratio by manipulating the diameter of the pores. Of course, one can manipulate the SA:V ratio to tailor the membrane for different applications.

Decreasing the diameter of the nano-channels of the membrane, increases the SA:V ratio and in turn increases the amount of ion coordination by aluminum oxide via its ion-hopping pathway. This allows control over the ion-coordinating ability of the membrane by manipulation of the pore size. The limited pore sizes of the membrane can also enhance the ion-coordinating ability of polymers and other species present within the pores. Limited pore size constrains polymers which causes them to straighten out and thus become more efficient at transporting ions.

Although pore size can be adjusted, it is critical to the present invention that the pore diameter of the membrane is between 2 nm-150 nm, to take advantage of the ion-hopping mechanism. It may be preferable to use pore size in the range of 5-100 nm, and maybe more preferably to use pore sizes in the range of 5-50 nm. Membranes with pore diameters greater than 150 nm transport a majority of ion conduction via bulk electrolyte (if present) and not efficiently through the ion-hopping mechanism of AAO. Membranes with pore diameters less than 5 nm are unpractical as they are difficult to manufacture, have low porosities, can be difficult to chemically modify and can be difficult to coat.

The porosity of the membrane can also be used to tailor the ion conductivity. A suitable porosity range is between 5-65%. See, also U.S. Pat. No. 6,627,344 issued to Kang on Sep. 20, 2003; U.S. Pat. No. 6,589,692 issued to Takami on Jul. 8, 2003; and U.S. Pat. No. 5,290,414 issued to Marple on Mar. 1, 1994.

The tortuosity of the membrane is the distance the ions travel in transversing the pore structure ratioed against the geometric width of the membrane. A tortuosity of unity is generally considered the ideal value for fast rates of conductivity as is represents a membrane having straight pores and thus the shortest distance between to opposite faces. However, membranes having tortuosity values greater than 1 may be used to create membranes with varying degrees of conductivity. The tortuosity can be manipulated by growing the AAO in a magnetic field and varying the angle of the magnetic field relative to the direction the AAO is grown.

Once the membrane has been made, its pores can be dilated by chemical etching, or contracted by processes such as atomic layer deposition and chemical vapor deposition. The second of the two processes can be used to fine tune the chemistry of the pore walls by changing the way in which the membrane coordinates ions (i.e. $Li^+$).

Chemical Modifications

The ion coordinating ability of the membrane can also be changed by manipulating the chemical structure of the matrix of the pore wall surface. The pore walls can be chemically modified by coating the walls with an organic solution containing ions, an aqueous solution containing ions, an ion-conductive polymer, or combinations thereof, which enhance or retard the coordination and transport of positive ions. In addition, the charge of the metal oxide can be changed by treatment of the walls with acids or bases. Alternatively ion conducting salts or species can be melted or otherwise attached, absorbed, or embedded in the pore wall surface.

Although the thickness of the pore wall surface coating can be varied, the thickness is preferably less than about one half the diameter of the pore. In one or more preferred embodiments, the thickness of the surface coating is less than about one quarter the diameter of the pore. In additional preferred embodiments, the thickness of the surface coating is less than about one tenth of the pore diameter.

In order to take full advantage of the one or more embodiments of the present invention and the unique physicochemically active pore walls, the coating on the surface of the pore wall should not be so thick that the entire pore is filled with the coating material as ion transport will not occur primarily through the bulk electrolyte filling the pores. Filling the pore is also an inefficient use of the coating material and may leak out of the cell resulting in a chemical hazard. Thus, in the present invention electrolyte conductivity is dominated by ion transport of a thin surface coating on the surface of the unique physicochemically active pore walls.

AAO-Salt Coating

The invented separator-electrolyte can be created by the addition of a variety of compounds and/or species to the surface of the pore walls, however, unlike prior art membranes, the present membrane only requires the addition of one ion-conducting component like a salt (or ion) to become active. Salt coatings can be added in a variety of ways including but not limited to: washing the pore walls with various salt containing solvents, melting salts directly onto the pore walls and combinations thereof. When applying the salt using the solution the membranes are washed with a solution containing the salts and the solvent is evaporated by techniques well known in the art (i.e. heat) leaving a salt coating on the walls of the pores.

Although the thickness of the salt coating on the pore wall surface can be varied, the thickness is preferably less than about one half the diameter of the pore. In one or more preferred embodiments, the thickness of the surface coating is less than about one quarter the diameter of the pore. In additional preferred embodiments, the thickness of the surface coating is less than about one tenth of the pore diameter.

As noted above, in order to take full advantage of the one or more embodiments of the present invention and the unique physicochemically active pore walls, the coating on the surface of the pore wall should not be so thick that the entire pore is filled with the coating material as ion transport will not occur primarily through the bulk electrolyte filling the pores. Filling the pore is also an inefficient use of the coating material and may leak out of the cell resulting in a chemical hazard. Thus, in the present invention electrolyte conductivity is dominated by ion transport of a thin surface coating on the surface of the unique physicochemically active pore walls.

In one embodiment the pore walls are treated with an organic solutions containing at least one ionic species. Suitable organic solutions include those having one of the following compounds: methanol, formamide, propylene carbonate, ethylene carbonate, .gamma.-butyrolactone, 1,3-dioxolane, dimethoxyethane, dimethyl carbonate, methylethyl carbonate, diethyl carbonate, tetrahydrofuran, dimethyl sulfoxide and polyethylene glycol dimethyl ether; combined with at least one salt selected from the group of: lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$) and lithium bistrifluoromethanesulfonyl amide ($LiN(CF_3SO_2)_2$).

In another embodiment the membranes pores are treated with aqueous solution containing a salt or other ionic species. Suitable salts include but are not limited to: $ZnCl$, $AlCl_3$, $AlCl_3.6H_2O$, $Al(NO_3)_3$, $HCl$, $NH_4OH$, $H_2SO_4$, $NaOH$, $KOH$, $LiOH$, $CsOH$, $NaCl$, $KCL$, $CsCl$, $Al_2(SO_4)_3$.

Alternately, the pore walls can be directly treated by melting the salt onto the surface of the pore wall. Preferred salts include but are not limited to: lithium iodide, lithium bromide, lithium chloride lithium fluoride and combinations thereof.

Individual anions and cations (e.g., $Li^+$ ions) can also be imbedded into the surface matrix of the pore walls. Embedding ions into the matrix can be accomplished in a variety of ways including but not limited to the following: The AAO membrane is dried and evacuated to create open and clean pores. The evacuated AAO is exposed to metal alkoxides such as tetraethyl orthosilicate or aluminum isopropoxide or mixtures of metal alkoxides, which are in solution in dry organic solvents such as hexane. Reactions between the metal alkoxides and surface hydroxyl sites anchor the metal alkoxides to the channel walls. The AAO membrane is further treated by exposure to water vapor and or high temperatures to create a layered oxide surface. Bronsted acid sites, created via water and temperature treatments of the oxide layer, in a dried and evacuated AAO membrane can be further exposed to gaseous ammonia creating ammonium cation sites on the channel surface. Ammonium cations can be ion-exchanged for other cations such as lithium, sodium, rubidium, and cesium to create an ion-specific surface in the AAO membrane.

The chemical composition of the membrane itself can be modified to adjust the conductivity of the membrane. For example, mixed metal oxides can be employed to get desired results.

Figure 5:
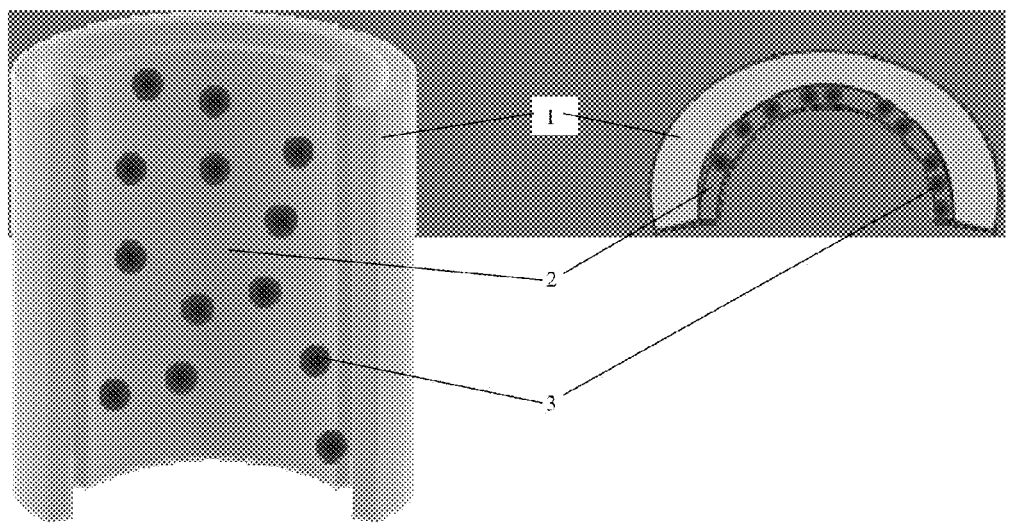
FIG. 5 is a three-dimensional cross-section and top-down cross-section of a single pore in one embodiment of the physicochemically active separator/electrolyte membrane of the present invention.
Figure 6A:
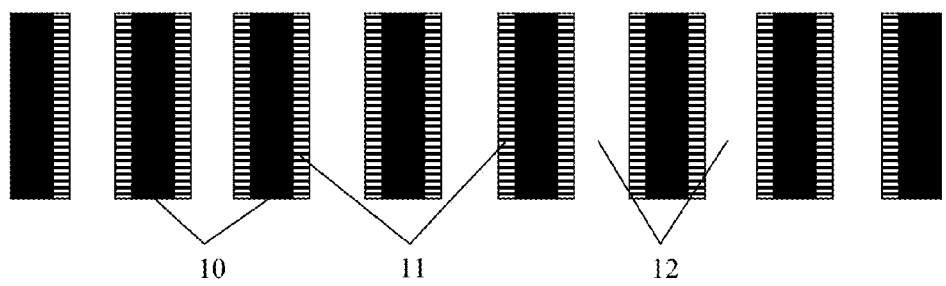
FIG. 6 is a cross-sectional view of one embodiment of the physicochemically active separator/electrolyte membrane of the present invention.

FIGS. 5 and 6A illustrates multiple embodiments of the present invention. FIG. 5 illustrates a cross-section of a single pore 1 of one embodiment of the physicochemically activated separator/electrolyte membrane of the present invention having a pore wall surface coating 2 with mobile ions 3 available for conduction. FIG. 6A illustrates another embodiment of the separator/electrolyte membrane of the present invention having a specialized material layer 10 comprising a number of pores 12. The pore walls 12 have a surface coating 11 comprising at least one ionic species, preferably lithium. As described in more detail above, the thickness of the pore wall surface coating 11 is less than about one half the diameter of the pore.

AAO-Alumina

Yet in another preferred embodiment the membrane pores are coated with nano-particles of alumina allowing ion-conduction via the ion-hopping mechanism creating a new super-highway of ion-conduction in AAO channels.

AAO-Polymer Hybrid Membrane

In another preferred embodiment, the pores of the membrane are coated with a layer of ion-conductive polymer, creating a synergistic AAO-polymer membrane. Suitable polymers include but are not limited to: polyether, polyethylene oxide, polypropylene oxide, polyacrylonitrile, polyvinylidene fluoride, polyvinylidene chloride, polymethyl methacrylate, polymethyl acrylate, polyvinyl alcohol, polymethacrylonitrile, polyvinyl acetate, polyvinylpyrrolidone, polyethyleneimine, polybutadiene, polystyrene, polyisoprene, vinylidene fluoride-hexafluoropropylene coploymer, poly(ethylene oxide), poly(propylene oxide), polyethylene glycols, polypropylene glycols, propylene carbonate, ethylene carbonate, dioctyl sebacate, diethyl phthalate, and derivatives of these polymers and combinations thereof.

The polymer material can be deposited in a variety of ways including but not limited to: a liquid solution of polymer in THF (tetrahydrofuran), or other volatile solvent, is added to the channels of the membrane drop-wise, and the THF is allowed to evaporate and disperse the polymer. The thickness of the polymer coating is preferably less than half the pore diameter. A suitable range of thickness is between 1-149 nm, dependent upon the diameter of the pores. The walls of the AAO-polymer hybrid membrane should contain at least one ion conducting salt (or other ion conducting species). The salt can be coated on the walls of the AAO membrane prior to the addition of the polymer or the salt can be incorporated within the polymer before the polymer is applied to the walls of the pores.

This polymer-AAO membrane allows ion conduction via two different pathways: (1) the fast ion-hopping mechanism along the walls of the AAO pores and (2) a slower mechanism dependent on segmental motion through the polymer. It is believed that in certain embodiments, the two mechanisms work together in synergistic fashion to allow rates of ion conduction that exceed (or deceed) either of the mechanisms working alone. This synergistic membrane can be customized for wide range of applications. For applications requiring very fast ion conductivity, cation conduction can be designed almost exclusively via a polymer-assisted fast hopping mechanism associated with alumina. This result is accomplished by limiting the use of the polymer to a thin film along the surface AAO pore walls. The pore walls of this synergistic membrane act as a superhighway for ion-conduction, allowing ions to travel via the hopping mechanism of the AAO membrane, via segmental motion or possibly by synergism. Applications with lower ion conduction requirements could be designed by increasing the amount of polymer present within the pores and thus the percentage of ion coordination and transport via the polymer.

In order to take full advantage of the one or more embodiments of the present invention and the unique physicochemically active pore walls, the coating on the surface of the pore wall should not be so thick that the entire pore is filled with the coating material as ion transport will not occur primarily through the bulk electrolyte filling the pores. Filling the pore is also an inefficient use of the coating material and may leak out of the cell resulting in a chemical hazard. Thus, in the present invention electrolyte conductivity is dominated by ion transport of a thin surface coating on the surface of the unique physicochemically active pore walls.

Laminated Membrane

In another preferred embodiment the top and bottom faces of the membrane are coated with an ion-conducting polymer. This laminated membrane allows fast ion conduction through the AAO portion of the membrane and allows enhanced connection between the membrane and electrodes when the membrane is used in a battery. A thin layer of soft polymer coating on the faces of the membrane creates a bridging effect between the hard and uneven interfacial surfaces of the electrodes and the porous membrane. This very thin polymer layer improves the conductivity of the electrolyte/electrode interface and obviates problems associated with polarization. Furthermore, the hybrid membrane overcomes many problems associated with previous very thin all-polymer membranes including breach of the polymer membrane separator which can cause unsafe conditions in all-polymer membranes but which would be protected by the metal oxide (or other) membrane in the present embodiment. Thickness of the polymer coating ranges from 1 nm to 10 µm. The preferred thickness is determined by the surface roughness of the electrode and AAO membrane. Smoother surfaces might only require a coating of 1 µm or less. Rough surfaces require up to a 10 µm thick (or even thicker) coatings. This represents an improvement over existing solid-state polymer electrolytes because in this application the polymer electrolyte film can be made much thinner. Thin films mitigate the polarization problem due to the sub-micron thickness of the films.

Conventional polymer electrolyte films are limited by the polarization effect. It is desirable to make these films as thin as possible, preferably less than 10 µm, which were unsafe in the prior art due to short circuit safety concerns. However, thick films are required to prevent internal short circuit due to the roughness of the electrode surface. In our application, a very thin film can be employed without short circuit hazards because of the AAO separator/electrolyte between the electrodes. The polymer can be a variety of polymers and can be deposited using a variety of techniques some of which have been discussed earlier in the polymer-hybrid embodiment. It should be noted that the laminate is added to an active membrane, the active membrane being described earlier (i.e. AAO-salt, AAO-polymer hybrid etc.).

Figure 6B:
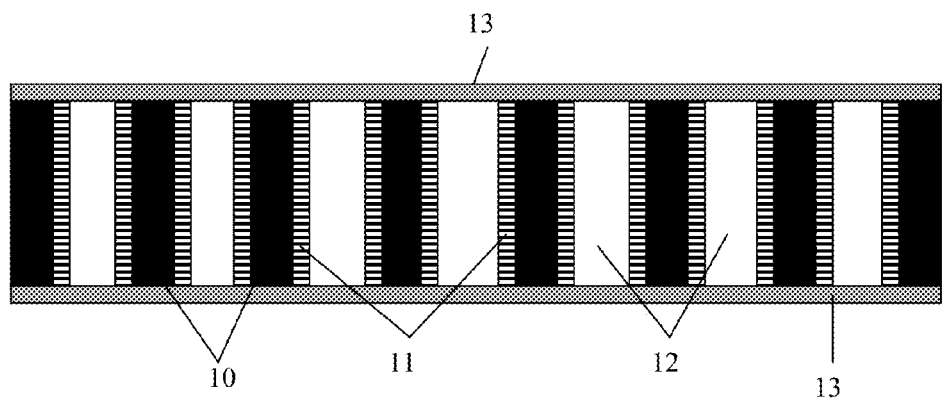

FIG. 6B illustrates one embodiment of a monolithic separator/electrolyte membrane having a first and second side both of which are coated with a polymer laminate membrane 13. The pore 12 walls of the specialized material layer 10 have a surface coating 11 of at least one ionic species, preferably lithium. As described in more detail above, the thickness of the pore wall surface coating 11 is less than about one half the diameter of the pore. Deposited on the first and second face of the metal oxide layer is a laminate membrane 13.

Laminate Safety Fuse

Another embodiment incorporates a thermal safety fuse into the membrane. For example, a thin layer of porous, non-ion conducting material like polyethylene or polypropylene is deposited on the electrode/electrolyte interface. The holes of the porous non-conducting material must line up with the holes of the active membrane, or the holes of the non-conductor coat must be larger than the active membrane so that ions can be conducted form cathode to anode in a cell. The top-coat is designed to melt at a temperature at which utilization of the battery becomes unsafe, thus covering the active membrane holes with a non-ionically conductive material, and disengaging the battery circuit by inhibiting conduction. It should be noted that the laminate is added to an active membrane, the active membrane being described earlier (i.e. AAO-salt, AAO-polymer hybrid etc.).

METHODS, EXAMPLES AND RESULTS

Example I

Anodized Aluminum Oxide Membrane

IA.—Aluminum strips of 98% purity (6.0 cm×1.5 cm×0.15 mm) were immersed in 0.3 molal oxalic acid maintained at 276 K and anodized at 40 VDC until transparent. Residual aluminum islands in the translucent anodized aluminum oxide (AAO) films were removed by oxidation using a solution of $CuCl_2$ in dilute HCl. The films were washed with deionized water, dried at 383 K for 15 minutes in air, and cooled under dry nitrogen. Removal of water coating the pore walls was accomplished by heating the membranes to 330 K under vacuum for two hours, or heating the membranes to 700 K under dry nitrogen.

IB.—Square pieces of aluminum foil, of 99.999% purity (2.0 cm×2.0 cm×0.10 mm) were, coated on one side with nail polished (to protect) and dried and then immersed in 0.3 molal oxalic acid maintained at 276 K and anodized at 40 VDC until transparent. Residual aluminum islands in the translucent anodized aluminum oxide (AAO) films were removed by oxidation using a solution of $CuCl_2$ in dilute HCl. The films were washed with deionized water, dried at 383 K for 15 minutes in air, and cooled under dry nitrogen. Removal of water coating the pore walls was accomplished by heating the membranes to 330 K under vacuum for two hours, or heating the membranes to 700 K under dry nitrogen.

IC.—The AAO templates with pore sizes of about 20, 50, and 100 nm were grown by potentiostatically anodizing aluminum plates (0.15 mm thick, 99.9+%) in an aqueous solution of 14% $H_2SO_4$, 4% and 2% oxalic acid respectively, and at a voltage of approximately 20V, 50V and 100V respectively. After the anodization, the remaining aluminum was etched by a 20%-0.1 mol☐$L^{-1}$ $CuCl_2$ mixed solution. Then, the barrier layer was dissolved using 20% $H_2SO_4$.

ID.—A device, called the single-sided anodizer, was developed to anodize one side of a planar aluminum sample. This device was employed to synthesize AAO in circular and other shaped areas on aluminum sheets and disks. The aluminum sheet (of purity 99.999%) is actively cooled at the bottom face, and anodization is confined to the top face. Typically, an o-ring (diameter, 1.5 cm) is used to define a circular area that will be exposed to an aqueous 0.3 M oxalic acid solution. A cylindrical container is made to compresses the o-ring to form a seal between the aluminum surface, the o-ring, and the open base of the container. The container is filled with the acid solution (approximately 10 ml), which is cooled to 275 K by contact with the cold aluminum. An aluminum metal strip cathode electrode is positioned in the acid solution at the top of the container. A potential of 40V DC is applied between the cathode (−) and the aluminum sample to be anodized, anode (+). The current and temperature are monitored by computer as the anodization process proceeds over a period of 1 week. The AAO sample is then removed and washed using distilled water. A 2 M HCl solution of $CuCl_2$ is drop wise added to the backside of the aluminum-supported AAO membrane to remove the residual aluminum; a transparent AAO disk surrounded by aluminum metal results. The aluminum-supported AAO membrane is washed with distilled water and dried under nitrogen at 700 K for two hours.

Example II

AAO-Coated (Salt) Membrane

IIA.—The pores in membranes were coated with organic salts, such as lithium triflate and lithium dodecyl sulfonate, by the application of solutions of these salts in THF, followed by solvent evaporation at elevated temperatures in a nitrogen atmosphere. The membranes were heated by laying them flat on a heating mantel. The application of the salt solutions was done drop wise on the top surface of the membrane.

IIB.—The pores in membranes were coated with inorganic salts, such as lithium iodide and lithium bromide, by the direct application of these salts to the membrane surface and heating the membrane under nitrogen gas in a furnace to the melting point of the salt.

One membrane was dried at 773 K in air and then coated with molten LiBr at the same temperature.

Example III

AAO-Polymer Hybrid Membrane

The pores of an AAO membrane are coated with a layer of a polymer electrolyte to form an ion conducting separator/electrolyte monolith. The polymer electrolyte is composed of PEO and lithium triflate and has an oxygen to lithium ion ratio of 8:1, and which is made by a well-know procedure. The pore walls are coated by placing the membrane on the surface of a hot plate and heating to 400 K in a dry nitrogen gas atmosphere. The polymer electrolyte is smeared onto the surface of the membrane and allowed to permeate the pores for a period of 10 minutes. The AAO membrane is turned over and the procedure is repeated. Any excess polymer one top or bottom faces of the membrane is removed from the surface. Complete and uniform coating of the pores may require several hours of heating. A piece of lithium foil (anode) is contacted to the top surface of the AAO membrane and a graphitic carbon electrode (cathode) is similarly contacted to the bottom surface. A potential is measured across the two electrodes. The potential indicates a transport of ion through the pores of the membrane Example IV AAO-Laminate Membrane A laminate membrane is fabricated by the following procedure. The pores of an AAO membrane are dried in an open-air furnace at 773 K and then coated with molten LiBr at the same temperature by placing anhydrous LiBr powder in contact with the membrane surface for 30 minutes. The membrane is cooled and transferred to a nitrogen atmosphere and heated on a hot plate to 400 K. A PEO/Li-triflate polymer electrolyte is smeared onto the surface of the membrane and excess electrolyte is scraped off using a knife edge. The AAO membrane is turned over and the procedure is repeated. Both surfaces of the AAO membrane are slightly tacky and easily adhere to the surfaces of electrodes. A piece of lithium foil (anode) is contacted to the top surface of the laminate AAO membrane and a graphitic carbon electrode (cathode) is similarly contacted to the bottom surface. A potential is measured across the two electrodes. The potential indicates a transport of ions through the thinly-laminated membrane surfaces and the pores of the membrane.

Voltage measurements for lithium-ion cells employing $Al_2O_3$ separator/electrolytes (using the specified salts) include: 2.5 V/lithium triflate; 1.3 V/lithium dodecyl sulfate; 0.5 V/LiBr. These results and preliminary electrochemical discharge curves indicate that lithium ions see an oxygen environment on the AAO walls that coordinate ion movement.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of the elements or sequences, or the use of numbers, letters or other designations therefor, is not intended to limit the claimed processes to any order except as may be specified in the claims. All ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like refer to ranges which can be subsequently broken down into sub-ranges as discussed above. Accordingly, the invention is limited only by the following claims and equivalents thereto.

All publications and patent documents cited in this application are incorporated by reference in their entirety for all purposes to the same extent as if each individual publication or patent document were so individually denoted.

We claim the following:

1. A physicochemically active monolithic separator-electrolyte membrane comprising: a specialized material layer of defined width having a plurality of pores running the width of the layer, the pores having diameters ranging from 2 nm to 150 nm, wherein the membrane has a defined porosity and wherein the pores have an inner wall surface, the inner wall surface having a surface coating selected from the group consisting of salts, anions, cations and combinations thereof, wherein the surface coating has a thickness of less than half the pore diameter and further wherein the pores are not otherwise filled.

2. The active membrane of claim 1, wherein the surface coating has a thickness of less than about one half the diameter of the pores of the specialized material layer.

3. The active membrane of claim 1, wherein the surface coating has a thickness of less than about, one quarter the diameter of the pores of the specialized material layer.

4. The active membrane of claim 1, wherein the pores have diameters ranging from 2 nm to 50 nm.

5. The active membrane of claim 1, wherein the specialized material layer is selected from the group of ion coordinating materials consisting of: metal oxides, specialized plastics, silicate glasses, and combinations thereof.

6. The active membrane of claim 5, wherein the specialized material layer is a metal oxide selected from the group consisting of: aluminum oxide, silicone oxide, titanium oxide, magnesium oxide, vanadium oxide, zirconium oxide, germanium oxide, tin oxide, gallium oxide, indium oxide, iron oxide, chromium oxide, molybdenum oxide, nickel oxide, copper oxide, zinc oxide and combinations thereof.

7. The active membrane of claim 6, wherein the specialized material is an aluminum oxide compound selected from the group consisting of amorphous aluminum oxide, dialuminum trioxide, alumina, crystalline alpha aluminum oxide, crystalline beta aluminum oxide, crystalline gamma aluminum oxide, or combinations thereof.

8. The active membrane of claim 1, wherein the specialized material is anodized aluminum oxide (AAO).

9. The active membrane of claim 1, wherein the membrane has a porosity of at least 30%.

10. The active membrane of claim 1, wherein the membrane has a tortuosity of less than about 2.

11. The active membrane of claim 1, wherein, the membrane has a mean thickness of between about 1 micron and 500 microns.

12. The active membrane of claim 1, wherein the membrane has a mean thickness of between about 10 nm and 1 micron.

13. The active membrane of claim 1, wherein the coating is a salt.

14. The active membrane of claim 1, wherein the inner walls of the pores are irreversibly coated with a compound selected from the group consisting of: $SiO_2$, $Al_2O_3$, $TiO_2$, $VO_2$, $TiN_2$ and combinations thereof.

15. The active membrane of claim 1, wherein the membrane has a first outer face and a second outer face opposite the first face, the pores running between the first and second faces, wherein a laminate is deposited upon the first and second faces.

16. The active membrane of claim 15, wherein the laminate comprises a polymer.

17. The active membrane of claim 15, wherein the laminate comprises a polymer selected from the group consisting of: polyether, polyethylene oxide, polypropylene oxide, polyacrylonitrile, polyvinylidene fluoride, polyvinylidene chloride, polymethyl methacrylate, polymethyl acrylate, polyvinyl alcohol, polymethacrylonitrile, polyvinyl acetate, polyvinylpyrrolidone, polyethyleneimine, polybutadiene, polystyrene, polyisoprene, vinylidene fluoride-hexafluoropropylene coploymer, poly(ethylene oxide), poly(propylene oxide), polyethylene glycols, polypropylene glycols, propylene carbonate, ethylene carbonate, dioctyl sebacate, diethyl phthalate, derivatives of these polymers and combinations thereof.

18. A physicochemically active monolithic separator-electrolyte membrane comprising: a specialized material layer of defined width having a plurality of pores running the width of the layer, the pores having diameters ranging from 2 nm to 150 nm, wherein the membrane has a defined porosity and wherein the pores have an inner wall surface, the inner wall surface having a surface coating comprising a lithium-containing salt, wherein the thickness of the surface coating is less than one half of the diameter of the pore and wherein the pores are not otherwise filled.

19. A physicochemically active monolithic separator-electrolyte membrane comprising: a specialized material layer of defined width having a plurality of pores running the width of the layer, the pores having diameters ranging from 2 nm to 150 nm, wherein the membrane has a defined porosity and wherein the pores have an inner wall surface, the inner wall surface having a surface coating comprising a lithium-containing salt, wherein the thickness of the surface coating is less than one half of the diameter of the pore and wherein the pores are not otherwise filled, and further wherein the membrane has a first outer face and a second outer face opposite the first face, the pores running between the first and second faces, wherein a laminate comprising a polymer is deposited upon the first and second faces.

* * * * *